Nov. 24, 1925.
J. J. COUCH
1,563,255
STONE PULLER
Filed Sept. 15, 1923
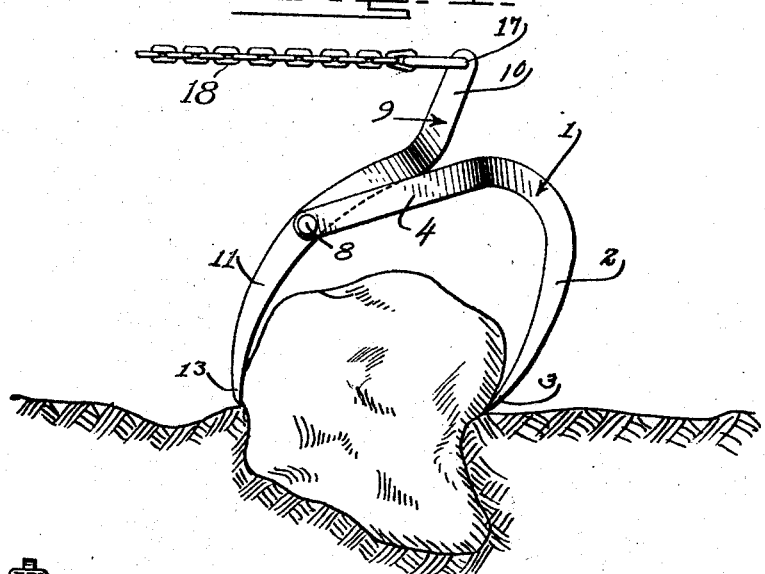
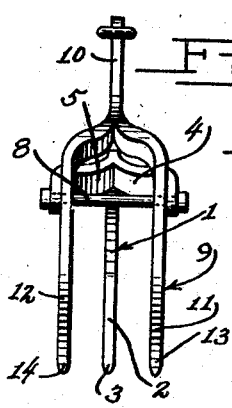
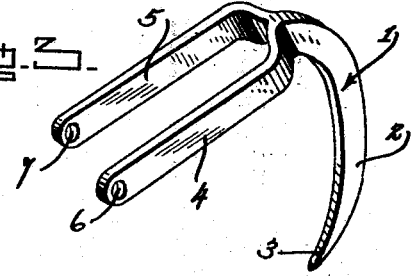
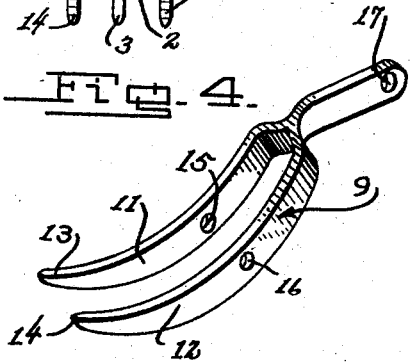
Inventor
Jay J. Couch
By
Attorneys Patented Nov. 24, 1925.

1,563,255

UNITED STATES PATENT OFFICE.

JAY J. COUCH, OF BISMARCK, NORTH DAKOTA.

STONE PULLER.

Application filed September 15, 1923. Serial No. 662,974.

*To all whom it may concern:*

Be it known that JAY J. COUCH, a citizen of the United States, residing at Bismarck, in the county of Burleigh and State of North Dakota, has invented certain new and useful Improvements in Stone Pullers, of which the following is a specification.

This invention relates to a stone puller and has for its principal object to provide a simple and efficient means whereby stones or other obstructions which have become embedded in the ground may be easily removed therefrom without any difficulty.

Another important object of the invention is to provide a stone puller of the above mentioned character, which is of such a construction as to enable the same to be used for removing stones or the like from the ground which are of any size or shape.

A still further object of the invention is to provide a stone puller of the above mentioned character, which will save considerable time and labor in clearing the ground of stone, growing stump or the like and which may be operated by any suitable draft appliance attached thereto.

A still further object of the invention is to provide a stone puller of the above mentioned character, which is simple in construction, inexpensive, strong, durable and further well adapted for the purposes for which it is designated.

Other objects and advantages of this invention will become apparent during the course of the following description.

In the accompanying drawings forming a part of this specification and in which like numerals designate like parts throughout the same:—

Figure 1 is a side elevation of my stone puller showing the same in use.

Figure 2 is an end view thereof.

Figure 3 is a detail perspective view of the hook and

Figure 4 is a detail perspective view of the gripping jaw.

In the drawings wherein for the purpose of illustration is shown the preferred embodiment of my invention, the numeral 1 designates generally the hook member of my stone puller and is provided with the curved lower portion 2 which terminates into a tapered point 3. The upper end of the hook member 1 is bifurcated and forms a pair of diverging arms 4 and 5 respectively. The arms 4 and 5 are provided with registering apertures 6 and 7 respectively adjacent the outer ends thereof as more clearly shown in Fig. 3 of the drawing. The purpose of this construction will be hereinafter more fully described.

Adapted to extend through the registering apertures 6 and 7 provided in the outer ends of the diverging arms 4 and 5 respectively of the hook member 1 is the pin 8. This pin 8 is of any suitable construction and such as to enable the same to be removably supported in the outer ends of the diverging arms.

Pivotally supported on the transverse extending pin 8 and between the outer ends of the diverging arms 4 and 5 is the gripping jaw designated generally by the numeral 9. This gripping jaw 9 comprises the shank portion 10 the lower end of which terminates into the downwardly converging portions 11 and 12 respectively and which are curved in the manner as more clearly shown in the drawings and terminate into the tapered lower ends or points 13 and 14 respectively. The bifurcated gripping jaw 9 has its furcations 11 and 12 provided with registering apertures 15 and 16 respectively and which are arranged intermediate the ends of the furcations or curved portions 11 and 12 of the gripping jaw 9.

The purpose of this arrangement is to enable the gripping jaw 9 to be pivotally supported between the outer ends of the diverging arms 4 and 5 of the hook 2 in such a manner as to support the gripping jaw 9 on the transverse pin 8 which extends through the registering apertures provided in the diverging arms and furcations respectively whereby the tapered lower ends of the gripping jaws will normally be above the tapered point 3 from the hook. The purpose of this arrangement enables a greater leverage to be obtained on the hook 1 when the same is in use and furthermore assure the proper operation of the stone puller.

In use, the hook 1 is placed around against the front portion of the stone or stump which is embedded in the ground; and the curved portions or furcations 11 and 12 respectively are adapted to engage the opposite side of the stone. When in this position, a suitable draft appliance which is connected to the upper end of the shank 10 through the aperture 17 provided therein will cause the gripping jaw 9 to move inwardly with respect to the hook 1 and when in firm engagement with the stone will cause the latter to be removed from the embedded position within the ground and thereby enable the stone to be more readily and easily handled when clearing the ground. In Fig. 1 of the drawing, I have shown a flexible connection 18 engaged with the aperture 17 of the shank 10 and any source of power (not shown) may be connected therewith. If a stump is desired to be removed from the ground the implement is used in the same manner and by causing the device to be pulled the stump will be uprooted from the ground and easily removed therefrom.

It will thus be seen from the foregoing description, that a stone puller has been provided wherein a simple means is used for clearing the ground of stones which have become embedded therein and which ordinarily is difficult to remove by use of the ordinary hand pick or shovel and which heretofore has required the loss of considerable time and also the employment of a number of persons.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to, without departing from the spirit or sacrificing any of the principles of the invention.

What I claim as new and desire to secure by Letters Patent is:—

1. A stone puller comprising a hook having its upper end provided with arms, a gripping jaw including a shank, the lower end thereof terminating into curved furcations, the furcations of said gripping jaw being pivotally supported intermediate their ends between the outer ends of said hook arms.

2. A stone puller comprising a hook having its upper end provided with diverging arms, a gripping jaw including a shank, the lower end of said shank being provided with spaced curved portions, said spaced curved portions being pivotally supported intermediate their ends between the outer ends of said diverging arms.

3. A stone puller of the class described comprising an enlarged hook member terminating at its upper end in integral divergent arms, said arms being parallel and arranged in a plane substantially at right angles to the plane of the main portion of the hook, a gripping jaw comprising a pair of spaced arcuate members, the ends of said members converging and terminating in an integral upwardly extending shank disposed angularly with respect to said members, means for pivotally supporting the arcuate members and said gripping jaw between the outer ends of the divergent arms of said hook member, and means adapted for engagement with the outer end of said shank to actuate the gripping jaw with respect to the hook, as and for the purposes described.

In testimony whereof I affix my signature.

JAY J. COUCH.